United States Patent
Kilchyk et al.

(10) Patent No.: US 12,152,495 B1
(45) Date of Patent: Nov. 26, 2024

(54) TURBINE WITH A PLURALITY OF INLET NOZZLES

(71) Applicant: Hamilton Sundstrand Corporation, Charlotte, NC (US)

(72) Inventors: Viktor Kilchyk, Lancaster, NY (US); John H. Paliulis, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/356,730

(22) Filed: Jul. 21, 2023

(51) Int. Cl.
  *F01D 17/00* (2006.01)
  *F01D 25/00* (2006.01)
  *F02C 9/16* (2006.01)
  *F02C 9/20* (2006.01)

(52) U.S. Cl.
  CPC ............. *F01D 17/00* (2013.01); *F01D 25/00* (2013.01); *F02C 9/16* (2013.01); *F02C 9/20* (2013.01)

(58) Field of Classification Search
  CPC .. F01D 17/00; F01D 25/00; F02C 9/16; F02C 9/20
  See application file for complete search history.

(56) References Cited

U.S. PATENT DOCUMENTS

| | | | |
|---|---|---|---|
| 5,180,278 A * | 1/1993 | Warner | F04D 27/0238 62/402 |
| 10,029,218 B2 | 7/2018 | Mason et al. | |
| 10,597,162 B2 | 3/2020 | Bruno et al. | |
| 11,047,237 B2 | 6/2021 | Bruno et al. | |
| 11,506,121 B2 | 11/2022 | Bruno et al. | |
| 11,511,867 B2 | 11/2022 | Bruno et al. | |
| 2017/0342899 A1 | 11/2017 | Bruno et al. | |
| 2020/0291800 A1 * | 9/2020 | Eckl | F01D 9/047 |

* cited by examiner

*Primary Examiner* — Audrey B. Walter
(74) *Attorney, Agent, or Firm* — CANTOR COLBURN LLP

(57) ABSTRACT

A turbine of an air cycle machine, having: a housing; an output shaft that spins about a spin axis; a turbine disposed on the output shaft; a first nozzle defining a first inlet area that directs a first flow into the housing, the first nozzle extending along a first axis that is disposed at a first meridional angle to the spin axis; a second nozzle defining a second inlet area that differs from the first inlet area, the second nozzle directs a second flow into the housing to provide a mixed flow within the housing, the second nozzle extending along a second axis that is disposed at a second meridional angle to the spin axis, the second meridional angle differing from the first meridional angle; and a control valve configured to open and close the second nozzle.

16 Claims, 5 Drawing Sheets

TURBINE WITH A PLURALITY OF INLET NOZZLES

BACKGROUND

The embodiments herein relate to turbines, and more specifically, to a turbine with a plurality of inlet nozzle sections. For the purpose of this document, the term nozzle or nozzles, refers to a nozzle section in turbine driven machinery. A nozzle section is typically a restriction controlling the flow rate and flow direction through specific geometry. The geometry consists of a singular restriction repeated around the circumference of, and located at, the turbine inlet.

Turbines typically utilize nozzles to maximize stage performance. A turbine's performance may benefit from multiple nozzles to achieve various flows and speed ranges as required by the application. As an example, turbines of the types utilized in an air cycle machine in an aircraft may be designed with a high specific speed value, referred to as its Ns value, which is indicative of its design point of maximum efficiency. Such turbines are configured to operate over a wide range of conditions. These turbines typically have a nozzle that is oriented perpendicular to the rotor inlet in the plane normal to the spin axis. If the inlet nozzle is configured with a single meridional inlet angle, the turbine may have relatively low performance due to excessive aerodynamic losses associated with the geometry of the nozzle and rotor.

BRIEF SUMMARY

Disclosed is a turbine of an air cycle machine, including: a housing; an output shaft that spins about a spin axis; a turbine disposed on the output shaft; a first nozzle defining a first inlet area that directs a first flow into the housing, the first nozzle extending along a first axis that is disposed at a first meridional angle to the spin axis; a second nozzle defining a second inlet area that differs from the first inlet area, the second nozzle directs a second flow into the housing to provide a mixed flow within the housing, the second nozzle extending along a second axis that is disposed at a second meridional angle to the spin axis, the second meridional angle differing from the first meridional angle; and a control valve configured to open and close the second nozzle.

In addition to one or more aspects of the turbine, or as an alternate, the turbine includes an exhaust, wherein the first nozzle is closer to the exhaust than the second nozzle.

In addition to one or more aspects of the turbine, or as an alternate, the first axis of the first nozzle is normal to the spin axis.

In addition to one or more aspects of the turbine, or as an alternate, a first relative angle, defined between the first and second axes, is acute.

In addition to one or more aspects of the turbine, or as an alternate, the radial turbine includes a rotor having rotor blades, and a radial axis extends through the rotor, normal to the spin axis; each of the rotor blades has a rotor blade tip that defines a first tangent axis that is normal to the radial axis; the first nozzle directs airflow at a first flow angle relative to the first tangent axis; and the second inlet nozzle directs airflow at a second flow angle relative to the first tangent axis, where the first and second flow angles differ from each other.

In addition to one or more aspects of the turbine, or as an alternate, the first and second flow angles are acute.

In addition to one or more aspects of the turbine, or as an alternate, one or both of: the first nozzle includes first vanes that are oriented along the first flow angle; and the second nozzle includes second vanes that are oriented along the second flow angle.

In addition to one or more aspects of the turbine, or as an alternate, the control valve opens the second nozzle when a radial turbine speed of the turbine is below a predetermined threshold specific speed, and closes the second nozzle when the radial turbine speed of the turbine is below the predetermined threshold specific speed.

Further disclosed is an air cycle machine of an aircraft, including: a compressor; and a turbine, including: a housing; an output shaft that spins about a spin axis and drives the compressor; a radial turbine disposed on the output shaft; a first nozzle defining a first inlet area that directs a first flow into the housing, the first nozzle extending along a first axis that is disposed at a first meridional angle to the spin axis; a second nozzle defining a second inlet area that differs from the first inlet area, the second nozzle directs a second flow into the housing to provide a mixed flow within the housing, the second nozzle extending along a second axis that is disposed at a second meridional angle to the spin axis, the second meridional angle differing from the first meridional angle; and a control valve configured to open and close the second nozzle.

In addition to one or more aspects of the air cycle machine, or as an alternate, the air cycle machine includes an exhaust, wherein the first nozzle is closer to the exhaust than the second nozzle.

In addition to one or more aspects of the air cycle machine, or as an alternate, the first axis of the first nozzle is normal to the spin axis.

In addition to one or more aspects of the air cycle machine, or as an alternate, a first relative angle, defined between the first and second axes, is acute.

In addition to one or more aspects of the air cycle machine, or as an alternate, the radial turbine includes a rotor having rotor blades, and a radial axis extends through the rotor, normal to the spin axis; each of the rotor blades has a rotor blade tip that defines a first tangent axis that is normal to the radial axis; the first nozzle directs airflow at a first flow angle relative to the first tangent axis; and the second nozzle directs airflow at a second flow angle relative to the first tangent axis, where the first and second flow angles differ from each other.

In addition to one or more aspects of the air cycle machine, or as an alternate, the first and second flow angles are acute.

In addition to one or more aspects of the air cycle machine, or as an alternate, one or both of: the first nozzle includes first vanes that are oriented along the first flow angle; and the second nozzle includes second vanes that are oriented along the second flow angle.

In addition to one or more aspects of the air cycle machine, or as an alternate, the control valve opens the second nozzle when the specific speed of the turbine is below a predetermined threshold speed, and closes the second nozzle when the specific speed of the turbine is below the predetermined threshold speed.

BRIEF DESCRIPTION OF THE DRAWINGS

The subject matter is particularly pointed out and distinctly claimed in the claims at the conclusion of the specification. The forgoing and other features, and advantages thereof are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the FIGS.

Figure 1:
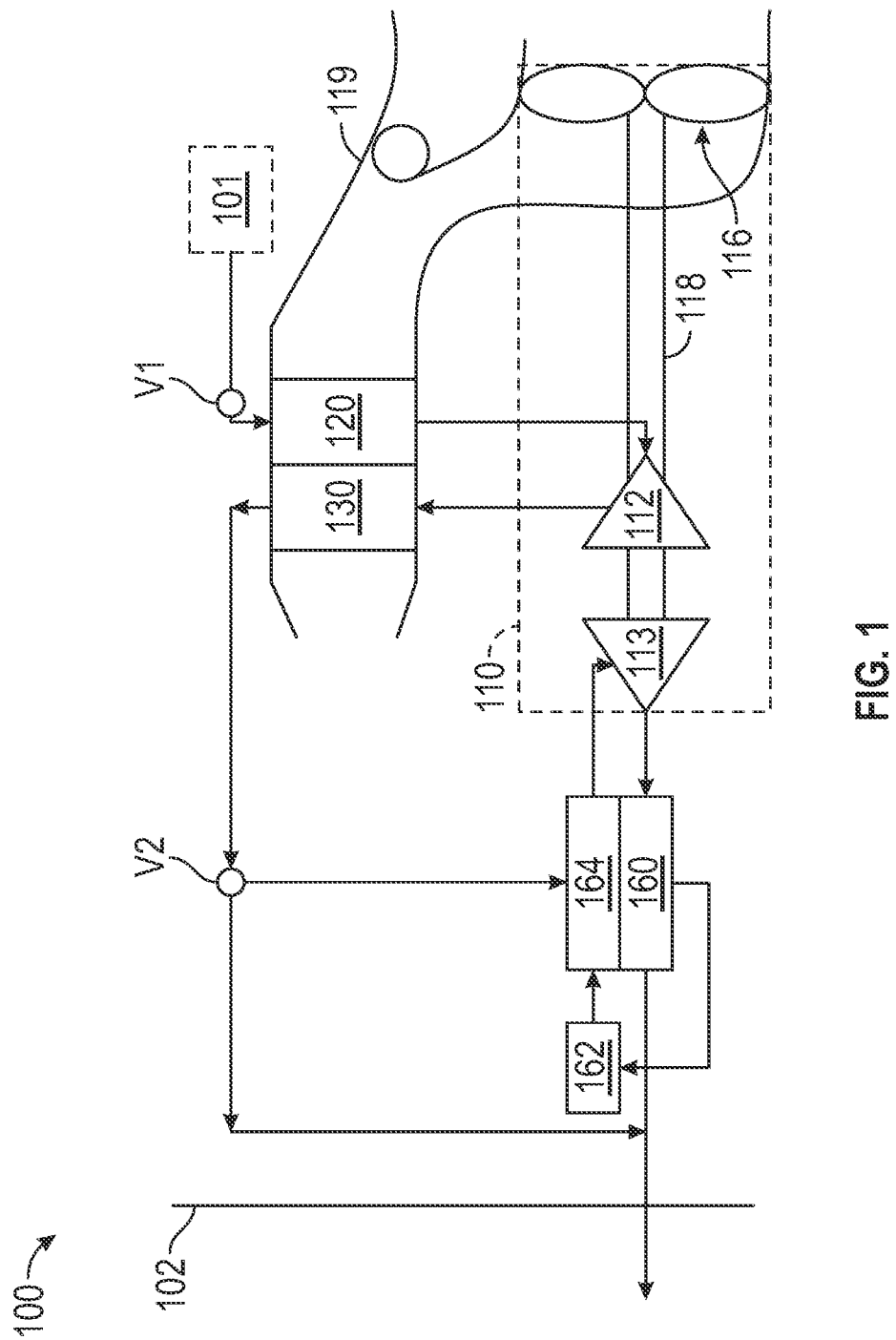
FIG. 1 is a diagram of a schematic of an environmental control system according to an embodiment.

Turning to FIG. 1, a system 100 that receives a medium from an inlet 101 and provides a conditioned form of the medium to a chamber 102 is illustrated. The system 100 comprises a compressing device 110. As shown, the compressing device 110 includes a compressor 112, a turbine 113, a fan 116, and a shaft 118. The system 100 also includes a primary heat exchanger 120, a secondary heat exchanger 130, a condenser 160, a water extractor 162, and a reheater 164.

The compressing device 110 is a mechanical device that includes components for performing thermodynamic work on the medium (e.g., extracts or works on the medium by raising and/or lowering pressure and by raising and/or lowering temperature). Examples of the compressing device 110 include an air cycle machine (ACM), a three-wheel ACM, a four-wheel ACM, etc.

The compressor 112 is a mechanical device that raises the pressure of the medium received from the inlet 101. Examples of compressor types include centrifugal, diagonal or mixed-flow, axial-flow, reciprocating, ionic liquid piston, rotary screw, rotary vane, scroll, diaphragm, air bubble, etc. Further, compressors can be driven by a motor or the medium via the turbine 113.

The turbine 113 is mechanical device that drives the compressor 112 and the fan 116 via the shaft 118. The fan 116 (e.g., a ram air fan) is a mechanical device that can force via push or pull methods air through the shell 119 across the heat exchangers 120 and 130 at a variable flow rate to control temperatures. The shell 119 receives and directs a medium (such as ram air) through the system 100. In general, ram air is outside air used as a heat sink by the system 100.

The heat exchangers 120 and 130 are devices built for efficient heat transfer from one medium to another. Examples of heat exchangers include double pipe, shell and tube, plate, plate and shell, adiabatic wheel, plate fin, pillow plate, and fluid heat exchangers.

The condenser 160 and the reheater 164 are particular types of heat exchangers. The water extractor 162 is a mechanical device that performs a process of taking water from the medium. Together, the condenser 160, the water extractor 162, and/or the reheater 164 can combine to be a high pressure water separator.

The elements of the system 100 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system 100. Valves can be operated by actuators, such that flow rates of the medium in any portion of the system 100 can be regulated to a desired value.

As shown in FIG. 1, the medium can flow from an inlet 101 through the system 100 to a chamber 102, as indicated by solid-lined arrows. A valve V1 (e.g., a mass flow control valve) controls the flow of the medium from the inlet 101 to the system 100. Further, a valve V2 controls whether the flow of the medium from the secondary heat exchanger 130 bypasses the turbine 113 in accordance with a mode of the system 100. A combination of components of the system 100 can be referred to as an air conditioning pack or a pack. The pack can begin at a valve V1 and conclude as air exits the pack 102.

With an aircraft, the medium can be air and the system 100 can be an environmental control system. The air supplied to the environmental control system at the inlet 101 can be said to be bled from a turbine engine or an auxiliary power unit. When the air is being provided by the turbine engine or the auxiliary power unit connected to the environmental control system, such as from the inlet 101, the air can be referred to as bleed air (e.g., pressurized air that comes from an engine or an auxiliary power unit). The temperature, humidity, and pressure of the bleed air vary widely depending upon a compressor stage and a revolutions per minute of the turbine engine.

Figure 2:
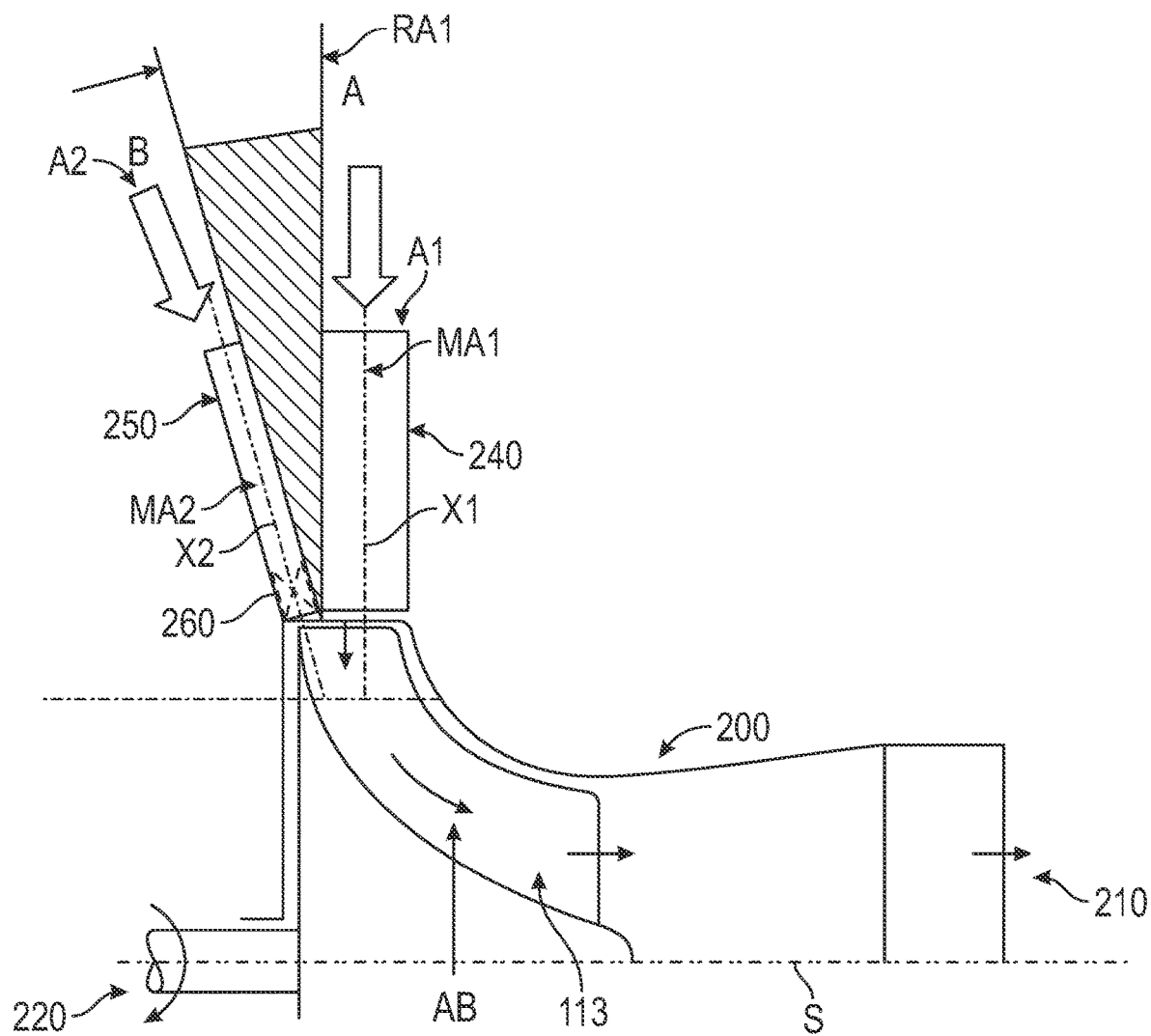
FIG. 2 shows a sectional view of a radial turbine with a plurality of inlet nozzles that may be utilized in the environmental control system of FIG. 1 or other turbine applications.

Turning to FIG. 2 additional aspects of the turbine 113, hereafter identified as turbine 113 to be consistent with figure notation, are shown. The turbine 113 may be configured with a high specific speed rating, such that it is configured to operate over a wide operating range. The turbine 113 has a housing 200 having an exhaust 210. The turbine 113 also includes an output shaft (for simplicity, a shaft) 220 that spins about a spin axis S that extends through the exhaust 210. The turbine 113 is disposed on the shaft 220, within the housing 200.

The turbine 113 has a first inlet nozzle (or first nozzle) 240 defining a first inlet area A1, and which directs a first flow A into the housing 200. The first nozzle 240 extends along a first axis X1 (FIG. 3) that is disposed at a first meridional angle MA1 to the spin axis S. The first meridional angle MA1 is normal to the spin axis S. When the first nozzle 240 is open, airflow passes through the first area A1 into the turbine.

Figure 3:
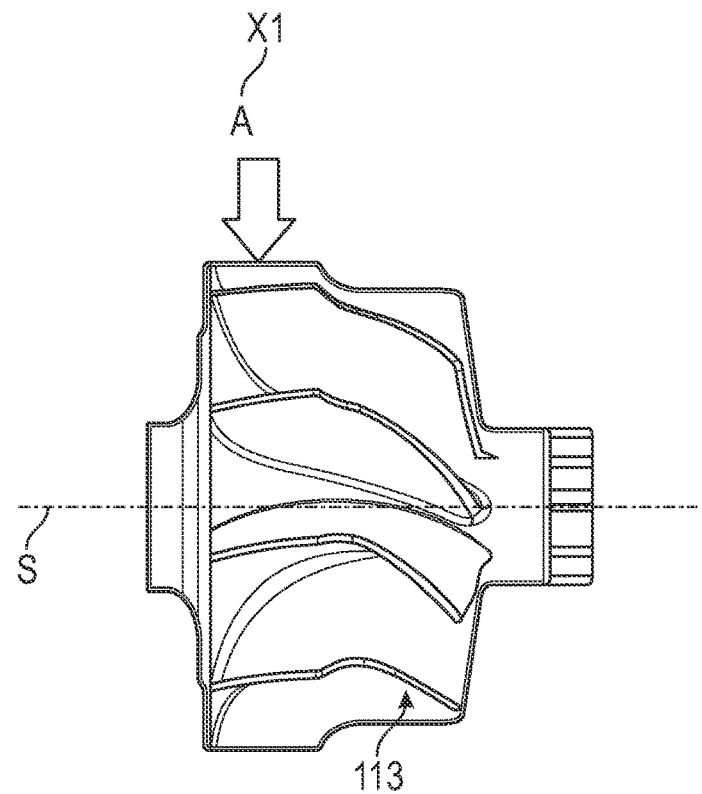
FIG. 3 schematically shows a rotor of the radial turbine with a flow from a first inlet nozzle of the plurality of inlet nozzles.

The turbine 113 has a second inlet nozzle (or second nozzle) 250 defining a second inlet area A2. The second inlet area A2 differs from the first inlet area A1, and for example, may be smaller than the first inlet area A1. When the second nozzle 250 is open, airflow passes through the second area A2 into the turbine. The second nozzle 250 extends along a second axis X2 that is disposed at a second meridional angle MA2 to the spin axis S such that the first and second inlet nozzles 240, 250 are disposed at a first relative angle RAI to each other. The first relative angel RAI is acute. As shown in FIG. 3, the first nozzle 240 is shown to be located closer to the exhaust 210 than the second nozzle 250, but that implementation is driven by application needs.

The second nozzle 250 includes a control valve 260 such that the second nozzle 250 is controllable between a closed state and an opened state. The control valve can be located at either the inlet or the outlet of the second nozzle section. The second nozzle 250 is in the closed state when a radial turbine speed is below a predetermined threshold of specific speed. At this time, only the first flow A along the first axis X1 is flowing through the housing 200 (FIG. 3).

Figure 4:
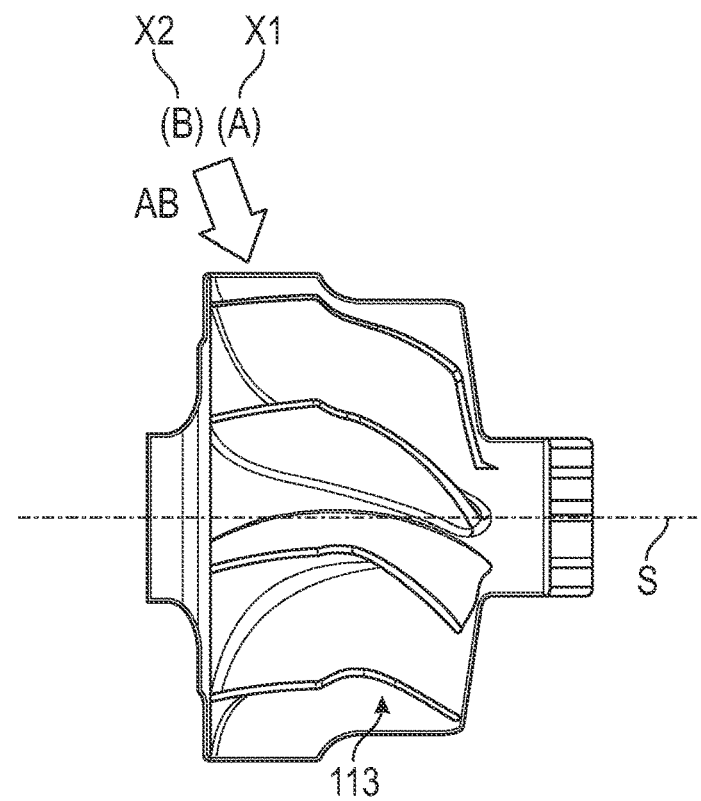
FIG. 4 schematically shows the rotor with a flow from both inlet nozzles of the plurality of inlet nozzles.

The second nozzle 250 is in an open state when the radial turbine speed is above the predetermined threshold specific speed. At this time, the first flow A along the first axis X1 and the second flow B along the second axis X2 are flowing into the housing 200 (FIG. 4) to produce a mixed flow AB.

At high specific speeds, the first flow A is primarily radial and has relatively high momentum along the first axis X1. As the exhaust 210 extends along the spin axis S, which is perpendicular to the first axis X1, turning the first flow A in the direction of the exhaust 210, at high speeds, results in relatively high losses. The mixed flow AB has momentum that is directed partially along the spin axis S. Thus, turning the mixed flow AB in the direction of the exhaust 210 results in relatively lower losses, and is thus more optimal, in terms of performance, than the first flow A alone.

It is to be appreciated that at low speeds, the first flow A can be turned in the direction of the exhaust 210 with relative ease. This is because the first flow A has less momentum along the first axis X1 at lower speeds. As a result, the second nozzle 250 may be closed via the control valve 260 at lower speeds.

Figure 5:
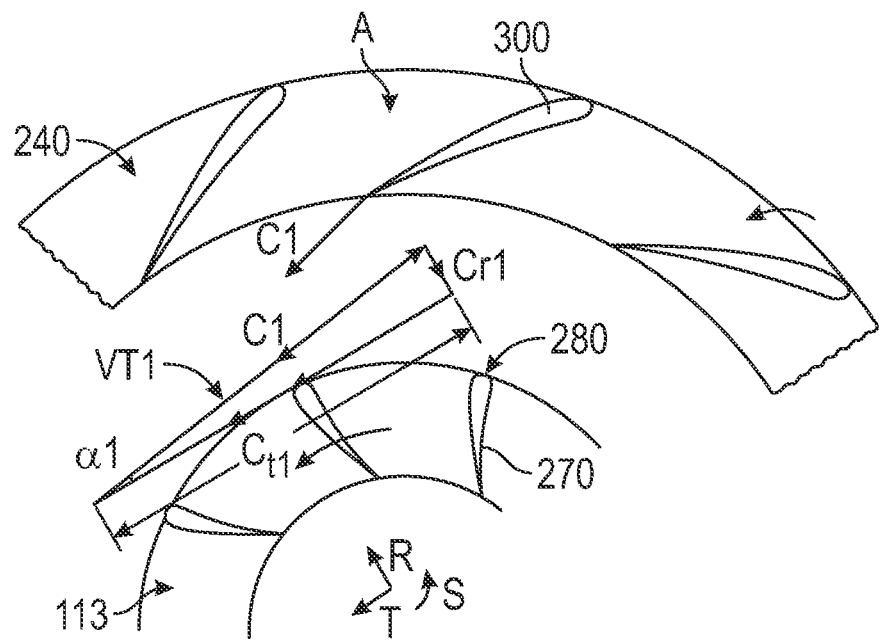
FIG. 5 shows a first velocity triangle of first flow against the rotor.

Turning to FIG. 5, the rotor 113 has rotor blades 270. Each of the rotor blades 270 has a blade tip 280. A radial axis R extends through the rotor 113, normal to the spin axis S, and a tangent axis T extends tangentially from the blade tip 280, normal to the radial axis R.

The first nozzle 240 includes first vanes 300, and the first flow A flows out of the first nozzle 240 along a first absolute flow vector (or first flow vector) C1, e.g., guided by the first vanes 300. Due to the orientation of the first vanes 300, the first flow vector C1 is disposed at a first absolute angle (or first flow angle) $\propto 1$ relative to the first tangent angle T. The first flow angle $\propto 1$ is acute and may result from the orientation of the first vanes 300 or by the first nozzle angle MA. As shown in a first velocity triangle VT1 in FIG. 5, the first absolute flow vector C1 has a first radial component Cr1 and a first tangential component Ct1.

Figure 6:
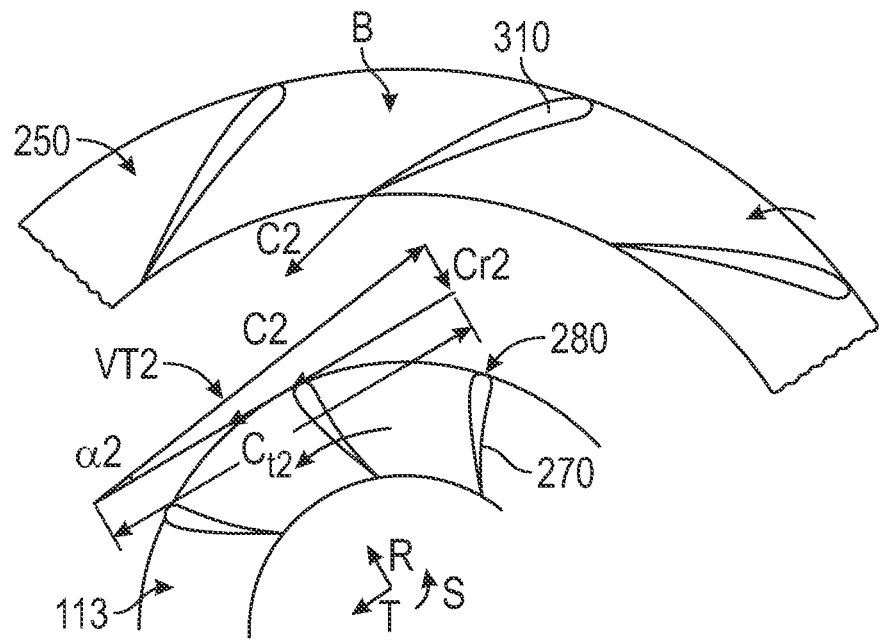
FIG. 6 shows a second velocity triangle of a second flow against the rotor.

As shown in FIG. 6, the second nozzle 250 includes second vanes 310, and the second flow B flows out of the second nozzle 250 along a second absolute flow vector (or second flow vector) C2, e.g., guided by the second vanes 310. Due to the orientation of the second vanes 310, the second flow vector C2 is disposed at a second absolute angle (or second flow angle) $\propto 2$ relative to the first tangent axis T. The second vane angel $\propto 2$ is also acute and may result from the orientation of the second vanes 310 or by the second nozzle angle MA2. As shown in a second velocity triangle VT2 in FIG. 6, the second absolute flow vector C2 has a second radial component Cr2 and a second tangential component Ct2.

In some embodiments, only one of the first and second nozzles 240, 250 have vanes 300, 310. In some embodiments, neither of these nozzles 240, 250 has vanes 300, 310. That is, voluted inlet scrolls may be configured to provide targeted nozzle inlet angles without a need for the flow turning vanes.

Figure 7:
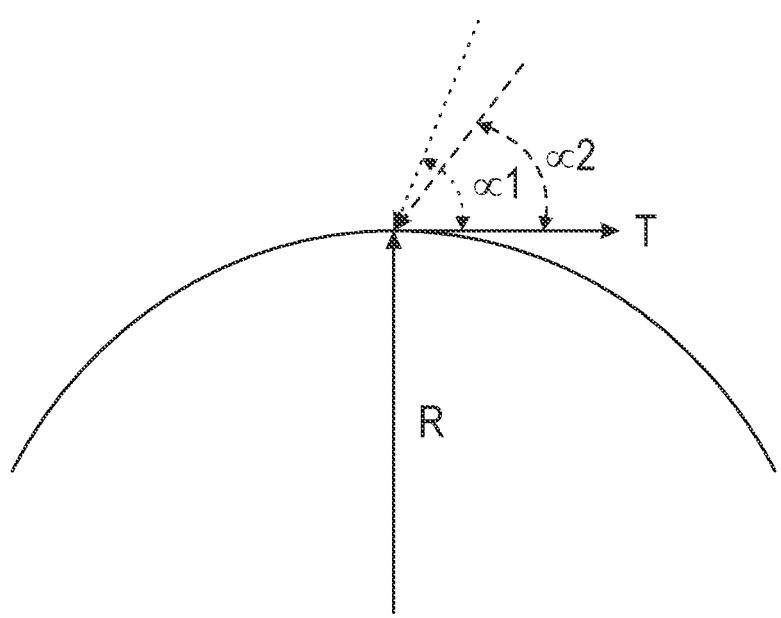
FIG. 7 shows first and second flow angles relative to a tangential axis defined by a blade tip of the rotor.

The second flow angle $\propto 2$ may be shallower (smaller) than the first flow angle $\propto 1$ (FIG. 7). The actual relative angel would be based on the application. As a result, the tangential flow component Ct2 may be greater than the first tangential flow component Ct1. Thus, with flow through both the first and second nozzles 240, 250, the tangential momentum in the mixed flow AB (FIG. 1) further directs the flow away from a radial direction X1. This allows for more easily turning the mixed flow AB in the direction of the exhaust 210.

Accordingly, the embodiments provide first and second (i.e., a plurality) inlet nozzles 240, 250 in a turbine 113 configured with a high specific speed value. The first nozzle 240, alone, is utilized when the turbine 113 is operating in a low to medium flow range. This is because in such flow regime, the turbine 113 is capable of turning a predominantly radial inlet flow toward the exhaust 210 with minimal losses. The first and second nozzles 240, 250 are both utilized when the turbine 113 is operating at the higher end of its the operational flow range. The second nozzle 250 has a second inlet angle MA2 along a meridional plane that is offset from the first inlet angle MA1 of the first nozzle 240. Further, the second tangential flow component Ct2 of the second nozzle 250 may be greater than the first tangential flow component Ct1 of the first nozzle 240. This combination of aspects enables the mixed flow AB from the first and second nozzles 240, 250 to turn toward the exhaust 210 with minimal losses. The turbine 113 disclosed herein reduces delays or minimizes flow separation against the rotor blades 270, enabling the turbine 113 to operate efficiently over a wide operational range. Though the turbine 113 has been disclosed in relation to an environmental control system, the turbine 113 may be utilized in other unrelated systems without departing from the scope of the embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A turbine of an air cycle machine, comprising:
   a housing;
   an output shaft that spins about a spin axis;
   a turbine disposed on the output shaft;
   a first nozzle defining a first inlet area that is configured to direct a first flow into the housing, the first nozzle extending along a first axis that is disposed at a first meridional angle to the spin axis;
   a second nozzle defining a second inlet area that differs from the first inlet area, the second nozzle is configured to direct a second flow into the housing to provide a mixed flow within the housing, the second nozzle extending along a second axis that is disposed at a second meridional angle to the spin axis, the second meridional angle differing from the first meridional angle; and a control valve configured to open and close the second nozzle.

2. The turbine of claim 1, further comprising:
an exhaust, wherein the first nozzle is closer to the exhaust than the second nozzle.

3. The turbine of claim 2, wherein:
the first axis of the first nozzle is normal to the spin axis.

4. The turbine of claim 3, wherein:
a first relative angle, defined between the first and second axes, is acute.

5. The turbine of claim 1, wherein:
the turbine includes a rotor having rotor blades, and a radial axis extends through the rotor, normal to the spin axis;
each of the rotor blades has a rotor blade tip that defines a first tangent axis that is normal to the radial axis;
the first nozzle is configured to direct airflow at a first flow angle relative to the first tangent axis; and
the second nozzle is configured to direct airflow at a second flow angle relative to the first tangent axis, where the first and second flow angles differ from each other.

6. The turbine of claim 5, wherein:
the first and second flow angles are acute.

7. The turbine of claim 5, wherein:
one or both of: the first nozzle includes first vanes that are oriented along the first flow angle; and the second nozzle includes second vanes that are oriented along the second flow angle.

8. The turbine of claim 1, wherein:
the control valve is configured to opens the second nozzle when a turbine speed of the turbine is below a predetermined threshold specific speed, and configured to closes the second nozzle when the turbine speed of the turbine is below the predetermined threshold specific speed.

9. An air cycle machine of an aircraft, comprising:
a compressor; and
a turbine, comprising:
a housing;
an output shaft that spins about a spin axis and drives the compressor;
a turbine disposed on the output shaft;
a first nozzle defining a first inlet area that is configured to direct a first flow into the housing, the first nozzle extending along a first axis that is disposed at a first meridional angle to the spin axis;
a second nozzle defining a second inlet area that differs from the first inlet area, the second nozzle is configured to direct a second flow into the housing to provide a mixed flow within the housing, the second nozzle extending along a second axis that is disposed at a second meridional angle to the spin axis, the second meridional angle differing from the first meridional angle; and
a control valve configured to open and close the second nozzle.

10. The air cycle machine of claim 9, further comprising:
an exhaust, wherein the first nozzle is closer to the exhaust than the second nozzle.

11. The air cycle machine of claim 10, wherein:
the first axis of the first nozzle is normal to the spin axis.

12. The air cycle machine of claim 11, wherein:
a first relative angle, defined between the first and second axes, is acute.

13. The air cycle machine of claim 9, wherein:
the turbine includes a rotor having rotor blades, and a radial axis extends through the rotor, normal to the spin axis;
each of the rotor blades has a rotor blade tip that defines a first tangent axis that is normal to the radial axis;
the first nozzle is configured to direct airflow at a first flow angle relative to the first tangent axis; and
the second nozzle is configured to direct airflow at a second flow angle relative to the first tangent axis, where the first and second flow angles differ from each other.

14. The air cycle machine of claim 13, wherein:
the first and second flow angles are acute.

15. The air cycle machine of claim 13, wherein:
one or both of: the first nozzle includes first vanes that are oriented along the first flow angle; and the second nozzle includes second vanes that are oriented along the second flow angle.

16. The air cycle machine of claim 9, wherein:
the control valve is configured to opens the second nozzle when the specific speed of the turbine is below a predetermined threshold speed, and configured to closes the second nozzle when the specific speed of the turbine is below the predetermined threshold speed.

* * * * *